United States Patent
Kopton

(10) Patent No.: US 9,999,935 B2
(45) Date of Patent: Jun. 19, 2018

(54) DRILLING TOOL, IN PARTICULAR REAMER

(71) Applicant: AUDI AG, Ingolstadt (DE)

(72) Inventor: Peter Kopton, Kösching (DE)

(73) Assignee: AUDI AG, Ingolstadt (DE)

( * ) Notice: Subject to any disclaimer, the term of this patent is extended or adjusted under 35 U.S.C. 154(b) by 0 days. days.

(21) Appl. No.: 15/514,693

(22) PCT Filed: Jul. 30, 2015

(86) PCT No.: PCT/EP2015/067579
§ 371 (c)(1),
(2) Date: Mar. 27, 2017

(87) PCT Pub. No.: WO2016/055185
PCT Pub. Date: Apr. 14, 2016

(65) Prior Publication Data
US 2017/0216945 A1    Aug. 3, 2017

(30) Foreign Application Priority Data

Oct. 7, 2014    (DE) .......................... 10 2014 014 932

(51) Int. Cl.
| | |
|---|---|
| *B23B 51/02* | (2006.01) |
| *B23D 77/14* | (2006.01) |
| *B23B 51/00* | (2006.01) |

(52) U.S. Cl.
CPC ............ *B23D 77/14* (2013.01); *B23B 51/009* (2013.01); *B23B 51/02* (2013.01); *B23B 2251/14* (2013.01);
(Continued)

(58) Field of Classification Search
CPC ... B23B 51/02; B23B 51/009; B23B 2251/14; B23B 2251/204; B23B 2251/242
See application file for complete search history.

(56) References Cited

U.S. PATENT DOCUMENTS

| | | | | |
|---|---|---|---|---|
| 327,148 | A | * | 9/1885 | Paught .................... B23B 51/00 408/229 |
| 370,484 | A | * | 9/1887 | Latham ......................... 408/225 |

(Continued)

FOREIGN PATENT DOCUMENTS

| | | |
|---|---|---|
| CN | 202 411 558 U | 9/2012 |
| DE | 27 50 705 | 5/1978 |

(Continued)

OTHER PUBLICATIONS

Machine translation, German patent document, DE 4437542, inventor, Basteck, A., Apr. 25, 1996.*

(Continued)

*Primary Examiner* — Daniel Howell
*Assistant Examiner* — Chwen-Wei Su
(74) *Attorney, Agent, or Firm* — Henry M. Feiereisen LLC

(57) ABSTRACT

A drilling tool, in particular a reamer, for drilling out a workpiece core bore to a nominal diameter by means of a main blade formed on a drill body is disclosed. The main blade has a radially external cutting edge which extends along a drill-body longitudinal axis as far as a blade corner arranged at the drill tip, wherein during the drilling-out operation, the drilling tool is drivable into the workpiece core bore with a rotary movement and a feed movement. The drilling tool has at least one groove blade which is arranged so as to precede the blade corner of the main blade in the direction of rotation of the tool. During the drilling-out operation, the groove blade produces a groove in the inner wall of the core bore drilling, the blade corner of the main blade being guided in the groove with an at least reduced cutting load.

8 Claims, 6 Drawing Sheets

(52) U.S. Cl.
CPC .. *B23B 2251/242* (2013.01); *B23D 2277/203* (2013.01); *B23D 2277/32* (2013.01); *B23D 2277/72* (2013.01)

(56) References Cited

U.S. PATENT DOCUMENTS

| | | | | |
|---|---|---|---|---|
| 1,000,067 | A * | 8/1911 | Bennett | E21B 10/445 |
| | | | | 408/224 |
| 1,418,485 | A * | 6/1922 | Smith | B23B 51/009 |
| | | | | 279/89 |
| 1,439,567 | A * | 12/1922 | Maupin | B23B 51/04 |
| | | | | 144/128 |
| 1,752,262 | A * | 3/1930 | Muhlhoff | B23B 51/00 |
| | | | | 144/219 |
| 2,630,725 | A * | 3/1953 | Black | B23B 29/03 |
| | | | | 407/48 |
| 4,274,771 | A | 6/1981 | Nishimura | |
| 4,948,305 | A * | 8/1990 | Reiterman | B23D 77/02 |
| | | | | 407/58 |
| 9,555,492 | B2 | 1/2017 | Kopton | |
| 2002/0172567 | A1 | 11/2002 | Popke | |
| 2005/0283160 | A1 | 12/2005 | Knisely | |
| 2007/0020057 | A1 * | 1/2007 | Chen | B23B 51/009 |
| | | | | 408/224 |
| 2008/0193234 | A1 | 8/2008 | Davancens et al. | |
| 2012/0121352 | A1 * | 5/2012 | Ning | B23D 77/02 |
| | | | | 408/229 |
| 2014/0294526 | A1 | 10/2014 | Kopton | |
| 2015/0158132 | A1 | 6/2015 | Kopton | |
| 2015/0266114 | A1 | 9/2015 | Kopton | |

FOREIGN PATENT DOCUMENTS

| | | | | |
|---|---|---|---|---|
| DE | 42 36 824 | A1 | 11/1993 | |
| DE | 4437542 | A1 * | 4/1996 | ......... B23B 51/0081 |
| DE | 10 2013 004 105 | A1 | 9/2014 | |
| JP | 2004261896 | A * | 9/2004 | |

OTHER PUBLICATIONS

International Search Report issued by the European Patent Office in International Application PCT/EP2015/067579/ dated Jul. 30, 2015.

* cited by examiner

DRILLING TOOL, IN PARTICULAR REAMER

CROSS-REFERENCES TO RELATED APPLICATIONS

This application is the U.S. National Stage of International Application No. PCT/EP2015/067579, filed Jul. 30, 2015, which designated the U.S. and has been published as International Publication No. WO 2016/055185 and which claims the priority of German Patent Application, Serial No. 10 2014 014 932.3, filed Oct. 7, 2014, pursuant to 35 U.S.C. 119(a)-(d).

BACKGROUND OF THE INVENTION

The invention relates to a drilling tool, in particular a reamer and a method for surface processing of an inner walling of a pre-drilled workpiece core bore.

From DE 10 2013 004 105 A1 a generic reamer is known which can for example be used in vehicle construction for fine processing of an inner walling of a cylinder head bore in order to improve the surface quality and shape and dimensional accuracy of the bore. At its outer circumference the reamer has at least one main blade with a radially outer cutting edge which extends spirally along the drill body longitudinal axis up to a cutting corner arranged at the drill tip. At the front-side blade corner the main blade transitions into a groove blade which is oriented transversely relative to the drill body-longitudinal axis.

With the above reamer the surface processing of the core bore is performed with the following process steps: in a first pre-processing step the reamer is inserted into the core bore with a low rotational speed and a feed speed adjusted to the rotational speed, whereby the groove blade generates a spiral groove in the inner walling of the core bore. In the fully inserted state the main blade, which adjoins the groove blade, is already fully engaged with the spiral groove. In the subsequent second processing step the main blade of the reamer can, through rotation, effect a circumferential material removal without axial feed.

The two processing steps have to be performed successively which is time consuming. Moreover, in the second processing step the circumferential material removal performed with the main blade is associated with a high cutting stress. Therefore in order to avoid premature tool failure the above reamer is preferably used for processing softer materials, for example aluminum.

SUMMARY OF THE INVENTION

It is an object of the invention to provide a drilling tool, in particular a reamer, in which a cutting stress of the drilling tool is reduced compared to the state of the art while enabling higher manufacturing speeds.

The object is solved by the features of the independent claims. Preferred embodiments of the invention are set forth in the dependent claims.

The invention is based on the fact that the above described reamer known from the state of the art requires a time-consuming two-step processing. Taking the foregoing into account the drilling tool according to the characterizing portion of patent claim 1 has at least one groove blade which is arranged so as to precede the blade corner of the main blade in the direction of rotation of the tool, which blade corner faces the drill tip. In the drill-out process the preceding groove blade generates a groove, which precedes the blade corner of the main blade. The blade corner of the main blade is guided in the preceding groove, i.e. substantially without being subjected to cutting stress. In this way the drilling tool can also be used in connection with harder materials without the risk of premature tool failure.

In conventional reamers on the other hand the blade corner of the main blade is subjected to very high cutting stresses at the drill tip. In such a conventional drilling tool the lateral main blade transitions at its front-side blade corner into a front-side transverse blade with which an additional material removal at the inner walling of the core bore is performed. In contrast, according to the invention the main blade is configured without such a front-side transverse blade.

The spiral groove generated by the groove blade in the drill-out process has a groove base which is recessed radially outwardly via a groove depth and which transitions via laterally elevated groove flanks into the inner walling of the core bore. For generating the groove the groove blade can have a front-side cutting edge at a drill tip, which front-side cutting edge extends transversely relative to the drill body-longitudinal axis. The front cutting edge can transition at a front-side blade corner into a radially outer groove-base cutting edge which extends along the drill body longitudinal axis. The groove-base cutting edge can extend up to a further cutting edge which faces away from the drill tip, with a further groove-flank cutting edge adjoining the groove-base cutting edge and extending transversely relative to the drill body longitudinal axis.

With the drilling tool according to the invention the drill-out process is no longer performed in two steps but in one insertion process. The drilling tool can hereby in particular be used in methods for a finishing or scrubbing processing for generating highly accurate bores. During the drill-out process the drilling tool is inserted into the core bore in a combined rotation and forward feed movement. The rotation and forward feed movements are hereby adjusted to each other so that the front-side blade corner of the main blade is guided in the spiral groove without being subjected to cutting stresses, which spiral groove is generated in the inner walling of the core bore by means of the leading groove blade. The main blade causes during the drill-out process thus exclusively a radially outer pealing processing while the groove blade removes material from the inner walling of the core bore in radial direction as well as in axial direction.

In the following the blade geometry of the drilling tool is described in more detail: on the front-side groove-flank blade a groove chip surface and a main free surface formed at the drill tip can converge. The groove chip rake face and the front side main free surface enclose a wedge angle. With respect to the forward feed speed in axial direction a free angle is important which is defined by the main free surface. In case of an increase of the forward feed movement the free angle is also increased. However this is associated with a reduction of the wedge angle of the front blade, which increases the risk of premature wear and tool failure.

At the groove-flank cutting edge, which faces away from the drill tip, and at the groove-base cutting edge the chip rake face transitions into further radially outer free surfaces, which define a free angle with an imagined circular line, along which the groove-flank cutting edge and the groove-base cutting edge move.

The blade corner of the main blade can be spaced apart from the groove blade by a longitudinal offset. The longitudinal offset is configured so that in coordination with the axial forward feed and the rotational movement the blade edge of the main blade is guided in the preceding groove.

Preferably the groove depth of the groove which extends spirally in inner walling of the core bore can be identical with the material thickness to be removed by the main blade or can be slightly smaller. Correspondingly the groove-base cutting edge can have a diameter which is smaller than or equal to the blade diameter of the cutting edge of the main blade.

In addition it is preferred when the main blade, which trails in tool rotational direction, overlaps the leading groove blade with a predetermined overlap in a direction opposite the forward feed direction. As a result after generating the spiral groove a remaining material web, which still has to be processed, can be removed by the trailing main blade to obtain the nominal diameter.

It is preferred when the front-side blade corner of the main blade is guided in the spiral groove completely without engagement with the material. For this purpose the front side blade corner of the main blade can be spaced apart by a free space from a groove flank of the groove, which precedes in forward feed direction.

The main blade and the groove blade together form a blade set. Preferably two, three or more blade sets can be arranged distributed about the circumference. In an embodiment the blade set may not only have a single main blade but at least two main blades arranged behind each other when viewed in the direction of rotation, both trailing the leading groove blade in the direction of rotation. The groove depth generated by the groove blade can preferably already correspond to the nominal diameter of the bore or as an alternative can be smaller than the nominal diameter.

The embodiments and/or refinements of the invention explained above and/or set forth in the dependent claims can be used individually or in any combination—except in cases of clear dependency or irreconcilable alternatives.

BRIEF DESCRIPTION OF THE DRAWING

It is shown in.

DETAILED DESCRIPTION OF PREFERRED EMBODIMENTS

Figure 1:
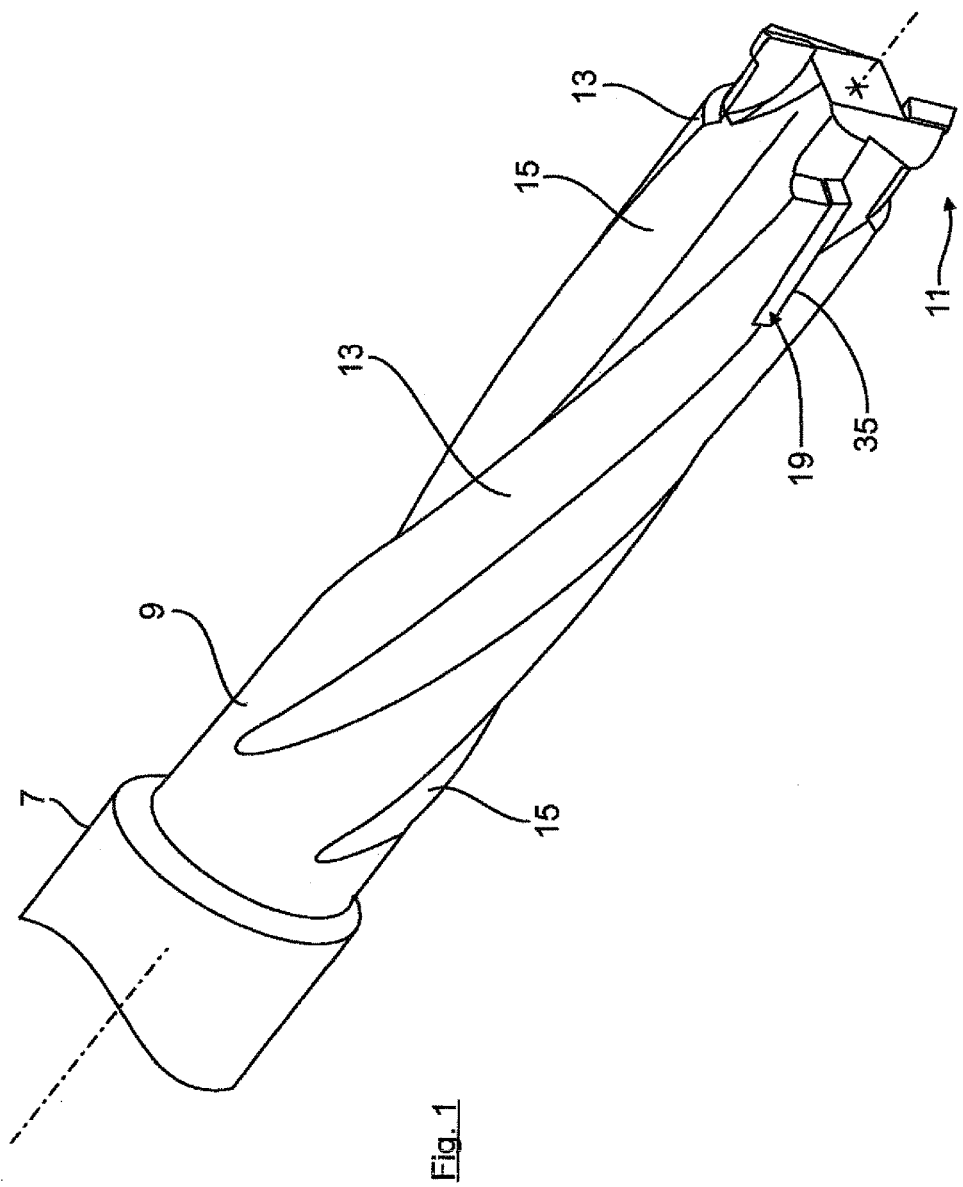
FIG. 1 a perspective view of a drilling tool configured as a reamer.
Figure 2:
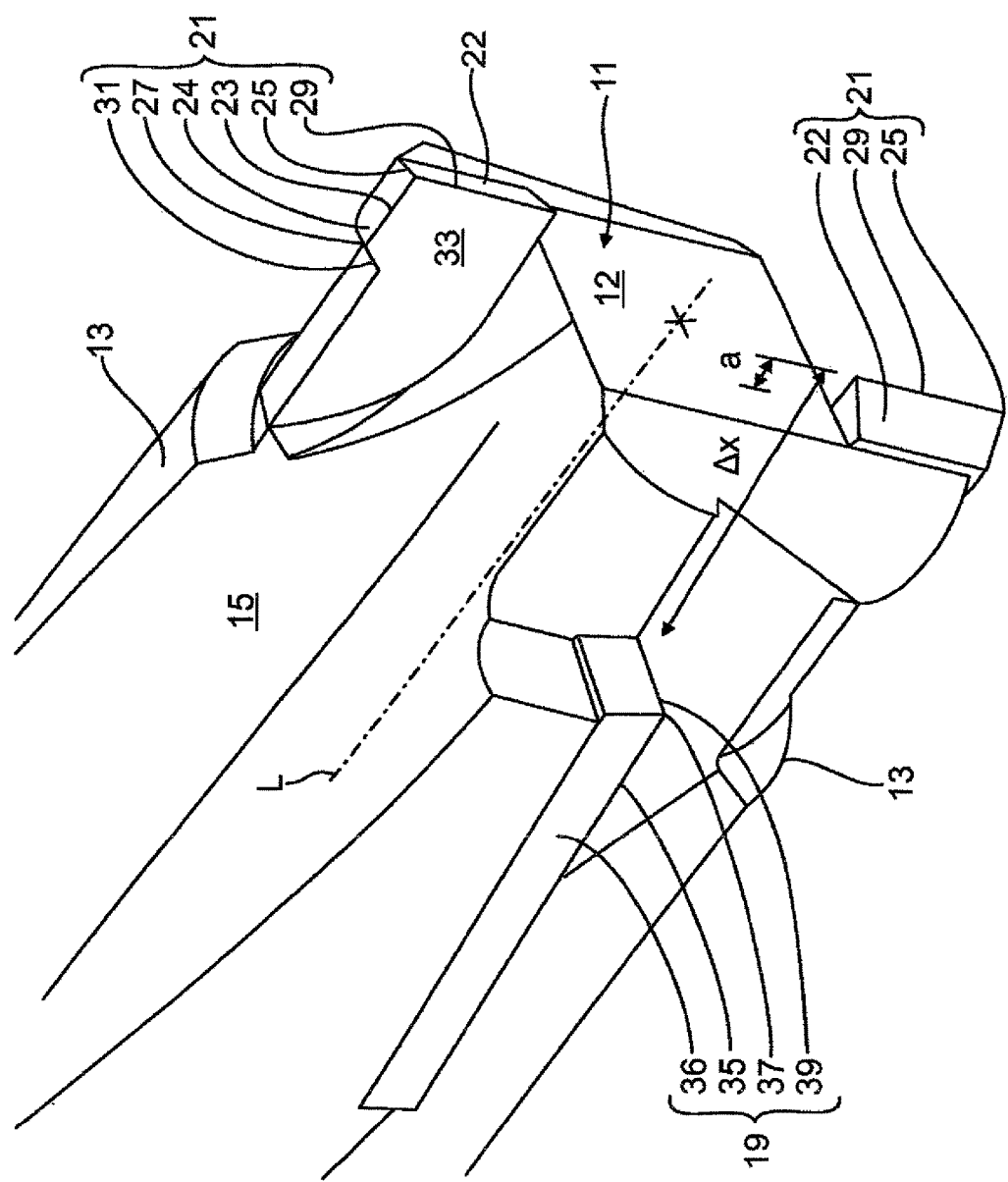
FIG. 2 a detail view of the tool tip of the drilling tool.

FIGS. 1 and 2 show a drilling tool for surface processing of an inner walling of a core bore 3 of a workpiece 5, shown below by way of FIGS. 3 and 4, and configured as a reamer. The drilling tool has a clamping shank 7 for clamping a not shown chuck of a drilling device and a drill body 9 adjoining the chuck. According to FIG. 3 between the flat drill tip 11 and the clamping shank 7 two drill webs 13 extend along a longitudinal axis L and helically about the longitudinal axis L. Between the two drill webs 13 flutes 15 are arranged.

In each of the drill webs 13 a blade set 17 (FIG. 5) is formed which each has a main blade 19 and a groove blade 21. The two blade sets 17 are arranged symmetrical with respect to the longitudinal axis L in order to ensure uniform cutting stress of the drilling tool.

As can be seen from FIG. 1 the main blades and groove blades 19, 21 are configured as separate insert parts which are fastened on the drill body 9 for example via not shown screw connections. The groove blade 21, which is arranged in the respective blade set 17 has a groove base cutting edge 23 which protrudes radially outwardly. The later extends according to FIG. 2 or 4 along the longitudinal axis L between a front-side blade corner 25 and a blade corner 27 facing away therefrom. The groove-base cutting edge 23 transitions at the front-side blade corner 25 into a front cutting edge 29 which at the drill tip 11 extends transverse relative to the longitudinal axis L and protrudes over a drill end face 12 with a protrusion a (FIG. 2). At the blade corner 27 facing away therefrom a groove-flank cutting edge 31 (FIG. 2) adjoins which also extends transversely relative to the drill body longitudinal axis L. At the above described cutting edges 23, 29, 31 a chip rake face 33 converges with free surfaces 22, 24 of the groove blade 21 which adjoin the respective cutting edges with a free angle.

As can further be seen from the Figures the main blade 19 is spaced apart from the groove blade 21 of the respective blade set 17 by a longitudinal offset $\Delta x$ (FIG. 2), which groove blade 21 is leading in the direction of rotation R. The main blade 19 is configured with a radially outer blade edge 35, which extends along the longitudinal axis L up to a blade corner 37, which faces the drill tip 11. At the blade corner 37 the cutting edge 35 transitions into a body edge 39 (FIG. 2 or 4) which extends transverse relative to the drill body-longitudinal axis L. The body edge 39 as well as the blade corner 37 do not engage with material of the inner walling 1 of the core bore during the drill-out process. Adjoining the cutting edge 35 of the main blade 19 against the tool rotation direction R is a further free surface 36 (FIG. 2).

Figure 3:
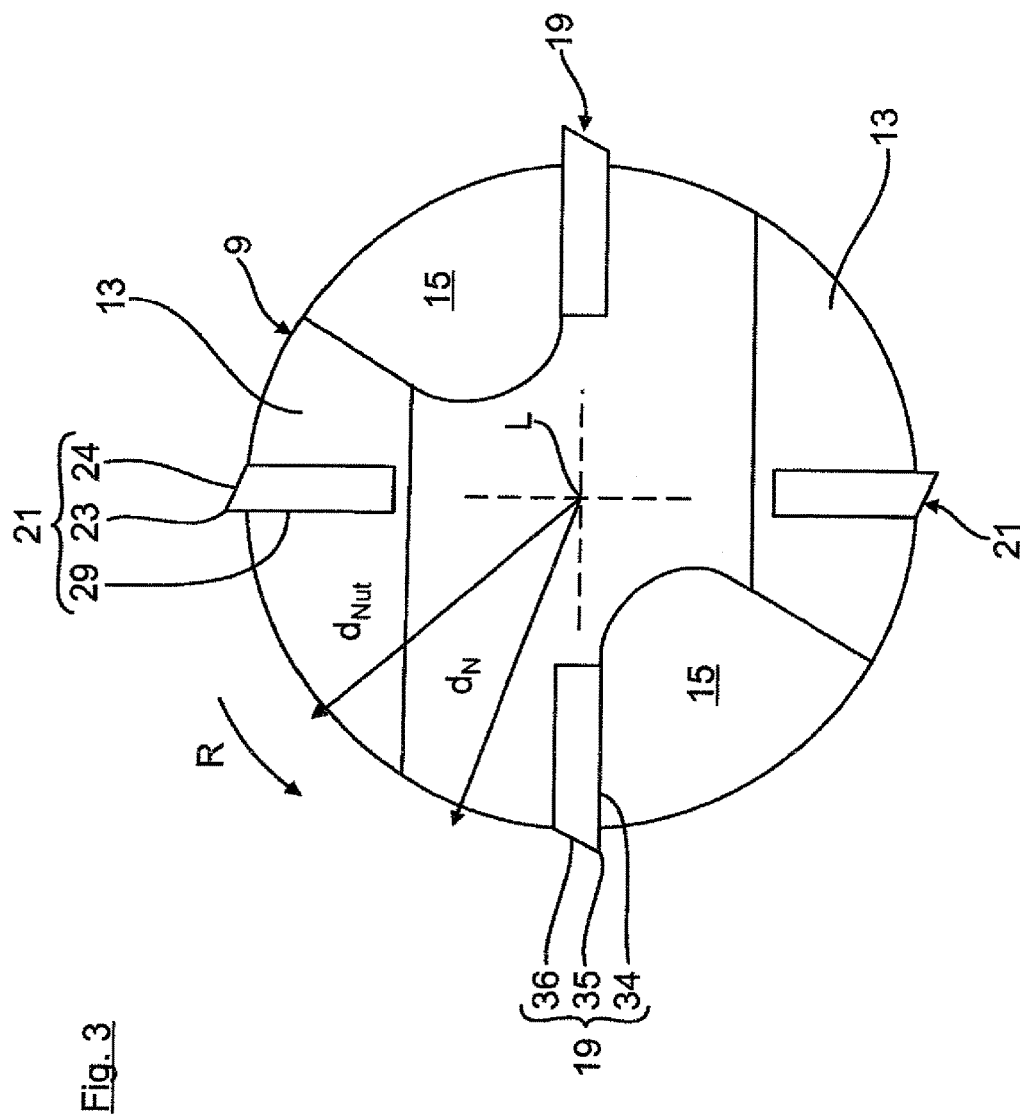
FIG. 3 a front view of the drill tip of the drilling tool.

In FIG. 3 the groove-base cutting edge 23 has a blade diameter $d_{Groove}$ which is smaller by a difference than the blade diameter $d_N$ of the radially outer cutting edge 25 of the main blade 19 which defines the nominal diameter of the bore 3. The difference can for example be 50 □m or smaller. As an alternative the two blade diameters can also be configured identical.

Figure 4:
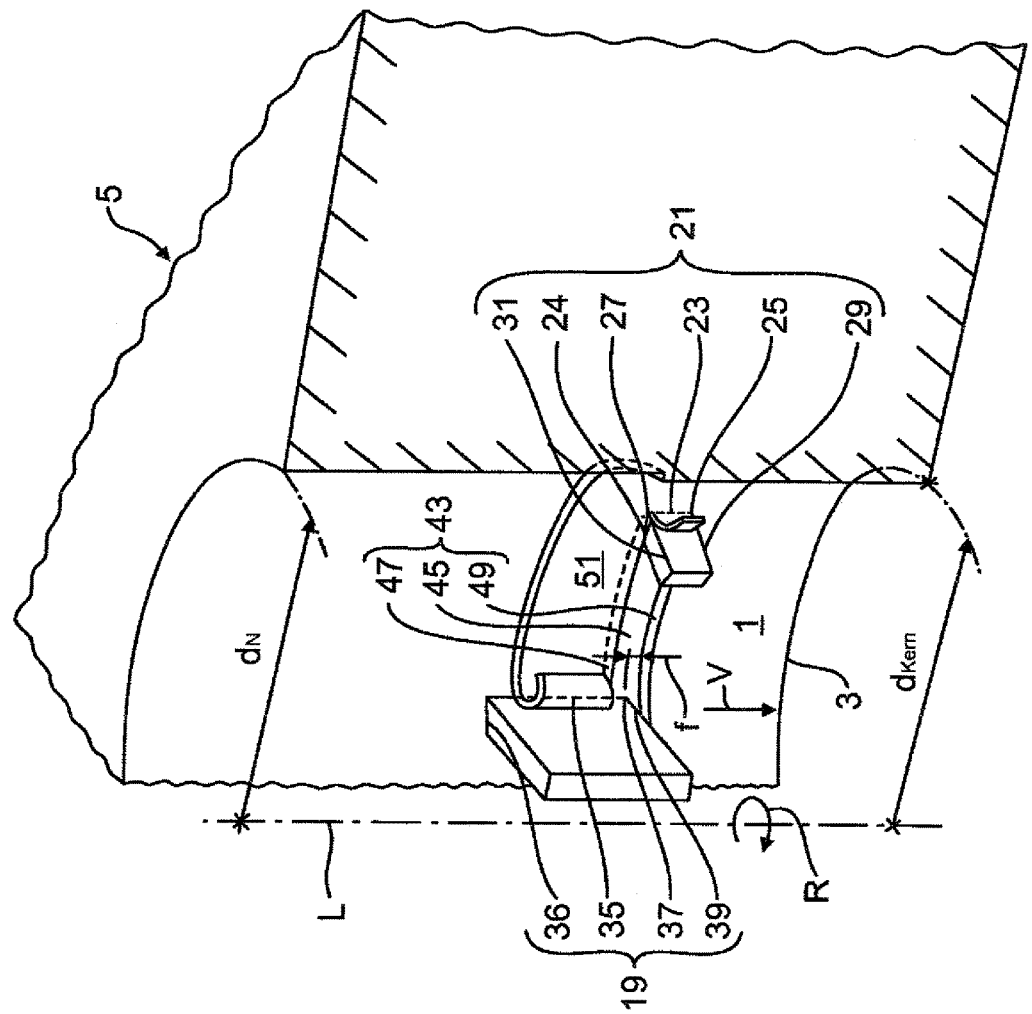
FIG. 4 a perspective strongly simplified partial view, which illustrates a bore-open process.
Figure 5:
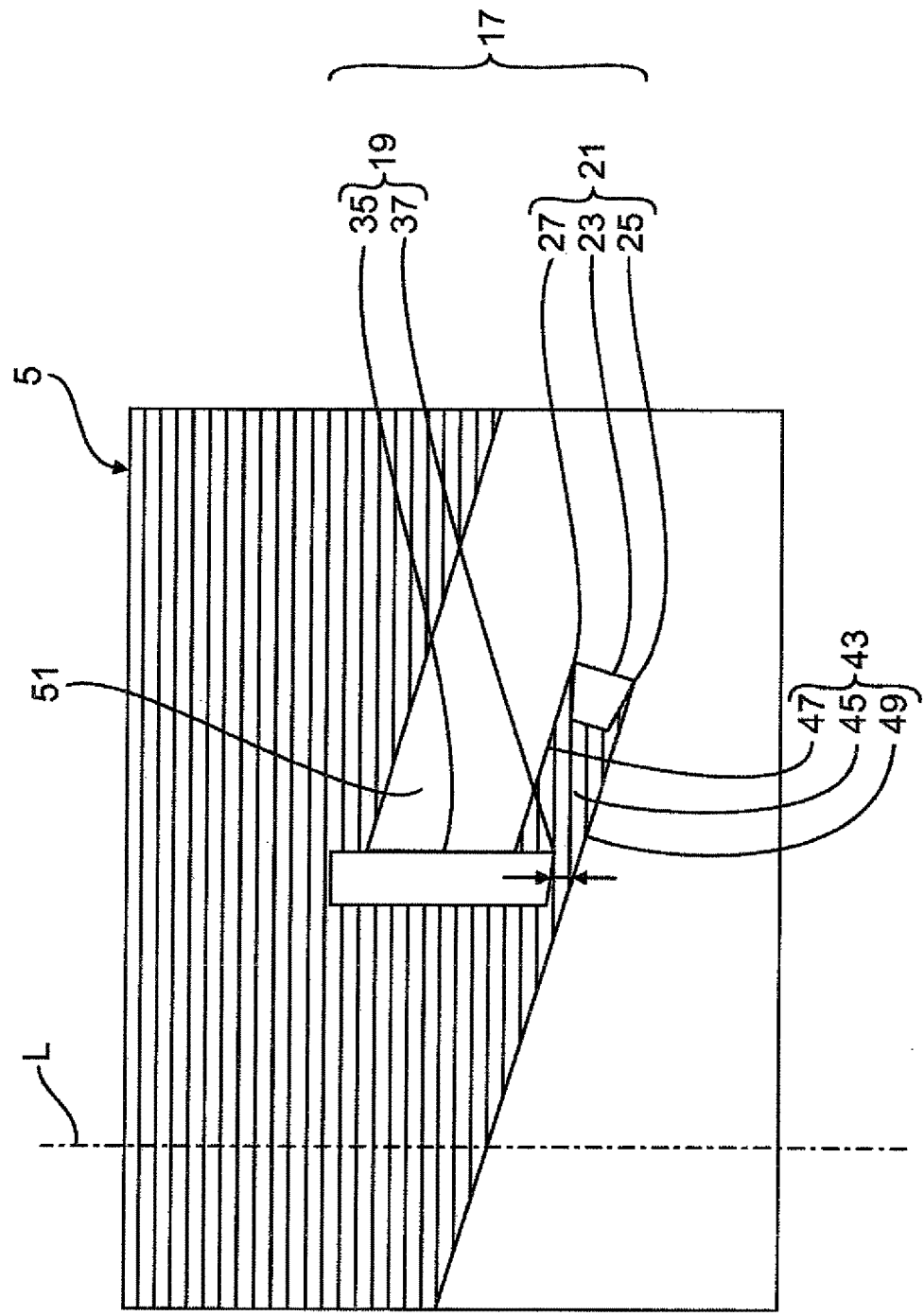
FIG. 5 a view corresponding to FIG. 4, however with a core bore inner walling shown in a developed view.

FIGS. 4 and 5 show the method for surface processing of the inner walling 1 of the core bore. For facilitating understanding only the groove and main blades 190, 21 of a single blade set 17 are shown in FIGS. 4 and 5, i.e., in the absence of the drill body 9. In FIG. 5 the already processed surface of the inner walling 1 is marked with horizontal lines, which is drilled out to a nominal diameter $d_N$ (FIG. 4). As a consequence the drilling tool is inserted in a combined rotational and forward feed movement R, V into the core bore 3 of the workpiece, which prior to the drill-out process has a core diameter $d_{Core}$ (FIG. 4). The rotational movement R and the axial forward movement V of the drilling tool is configured so that the groove blade 21 generates a spirally extending groove 43 in the inner walling 1 of the core bore, which spirally extending groove 43 according to FIG. 4 has a radially outer groove base 45 and lateral groove flanks 47, 49. The groove 43 is generated by means of the radially outer groove-base cutting edge 23, the upper groove-flank cutting edge 31 in FIGS. 3 and 4 and the front cutting edge 29 of the groove blade 21. In order to keep the cutting stress on the groove blade 21 low the groove width of the generated groove 43 is configured correspondingly small. The groove depth $\Delta t$ (FIG. 4) of the groove 43 is for example identical with the material thickness to be removed by the trailing main blade 19.

In FIG. 4 or 5 a still unprocessed material web 51 remains at the upper groove flank 47 which is located in opposite direction to the linear forward feed direction, which material web is removed by the trailing main blade 19, i.e., to the predetermined nominal diameter $d_N$ of the tool bore.

In addition in FIGS. 4 and 5 the blade corner 37 of the main blade 19 is guided in the leading groove 43, i.e., spaced apart with a free space f (FIG. 3 or 4) from the groove flank 49 which precedes in forward feed direction V. The blade corner 37 as well as the body edge 39 adjoining thereon therefore are not subjected to cutting stress which allows reliably preventing premature wear and tool failure of the reamer.

Figure 7:
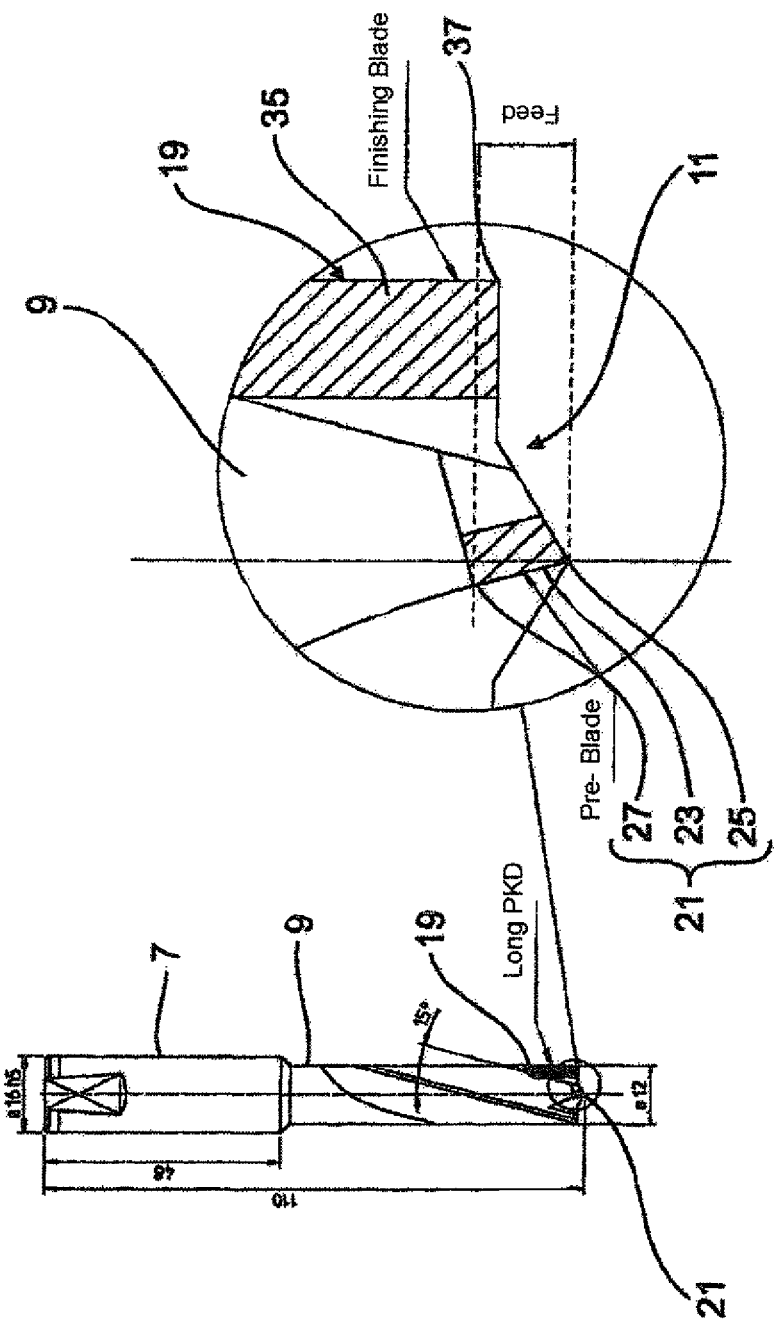
FIGS. 6 and 7 a further exemplary embodiment of the drilling tool.
Figure 6:

In FIGS. 6 and 7 a further exemplary embodiment of the drilling tool is shown. The general construction and the function is identical with the drilling tool of the exemplary embodiments above. As in the Figures above also in FIGS. 6 and 7 a respective blade set 17, a respective groove blade 21 and an associated main blade 19 are provided which trails the groove blade 21 in tool rotation direction. In contrast to the exemplary embodiment above the groove-base cutting edge 23 is dimensioned relatively small so that the generated groove has a groove width which is reduced compared to the exemplary embodiment above. In this way the cutting stress on the groove blade 21 can be further prevented.

What is claimed is:

1. A drilling tool, in particular reamer, for drilling out a core bore of a workpiece to a nominal diameter, said drilling tool comprising:
    a drill body;
    a main blade formed on the drill body, said main blade having a radially outer cutting edge extending along a longitudinal axis of the drill body up to a blade corner arranged at a drill tip of the drilling tool; and
    at least one groove blade arranged so as to precede the blade corner of the main blade in a direction of rotation of the drilling tool,
    said groove blade having a front cutting edge at the drill tip for generating said groove, said front cutting edge extending transverse to the longitudinal axis of the drill body and transitioning at the blade corner into a groove-base cutting edge which extends along the longitudinal axis of the drill body, said groove-base cutting edge transitioning at another blade corner which faces away from the drill tip into a groove-flank cutting edge, which extends transverse to the longitudinal axis of the drill body longitudinal axis,
    wherein a groove-chip rake face and a main free surface formed at the drill tip converge at the front cutting edge and enclose an angle defining a wedge shape, said groove-chip rake face extending substantially orthogonal to an exterior surface of the drill body and having a longitudinal plane congruent with a longitudinal axis of the drill body,
    wherein at the groove-flank cutting edge which faces away from the drill tip and at the groove-base cutting edge the groove-chip rake face transitions into further free surfaces which face radially outwardly, said further free surfaces adjoining the cutting edges in the rotation direction with a free angle,
    said blade corner of the main blade being spaced apart from the groove blade by a longitudinal offset,
    said groove blade being configured to generate in the inner walling of the core bore a groove during a drill-out process in which the drilling tool is inserted into the core bore at a defined rotary movement and at a defined forward feed movement, with the blade corner of the main blade being guided in the groove with at least reduced cutting stress.

2. The drilling tool of claim 1, wherein the groove-base cutting edge has a blade diameter, which is smaller than or equal to a blade diameter of the radially outer cutting edge of the main blade.

3. The drilling tool of claim 1, wherein at the blade corner which faces the drill tip, the radially outer cutting edge of the main blade transitions into a body edge, which is substantially unexposed to cutting stress caused by material removal.

4. The drilling tool of claim 1, further comprising at least two said groove blades arranged one after the other in the direction of rotation and arranged so as to precede the blade corner of the main blade.

5. The drilling tool of claim 1, wherein the at least one main blade and the at least one groove blade form a blade set.

6. The drilling tool of claim 5, wherein at least one or multiple said blade sets are formed on the drill body.

7. The drilling tool of claim 1, wherein the main blade and the groove blade are two separate components or are combined in a common cutting element.

8. A method for drilling out a predrilled core bore of a work-piece to a nominal diameter, said method comprising:
    inserting a drilling tool into the predrilled core bore with a defined rotary movement and a defined forward feed movement,
    said drilling tool comprising
    a drill body,
    a main blade formed on the drill body, said main blade having a radially outer cutting edge extending along a longitudinal axis of the drill body up to a blade corner arranged at a drill tip of the drilling tool, and
    at least one groove blade arranged so as to precede the blade corner of the main blade in a direction of rotation of the drilling tool,
    said groove blade having a front cutting edge at the drill tip for generating said groove, said front cutting edge extending transverse to the longitudinal axis of the drill body and transitioning at the blade corner into a groove-base cutting edge which extends along the longitudinal axis of the drill body, said groove-base cutting edge transitioning at another blade corner which faces away from the drill tip into a groove-flank cutting edge, which extends transverse to the longitudinal axis of the drill body longitudinal axis,
    wherein a groove-chip rake face and a main free surface formed at the drill tip converge at the front cutting edge and enclose an angle defining a wedge shape, said groove-chip rake face extending substantially orthogonal to an exterior surface of the drill body and having a longitudinal plane congruent with a longitudinal axis of the drill body,
    wherein at the groove-flank cutting edge which faces away from the drill tip and at the groove-base cutting edge the groove-chip rake face transitions into further free surfaces which face radially outwardly, said further free surfaces adjoining the cutting edges in the rotation direction with a free angle,
    said blade corner of the main blade being spaced apart from the groove blade by a longitudinal offset,
    wherein during said inserting the groove blade generates a groove in the inner walling of the core bore, said blade corner of the main blade being guided in the groove with at least reduced cutting stress and without material engagement and being spaced apart by a free space from a groove flank of the groove, which groove flank precedes in a direction of the forward feed movement, wherein after generation of the groove by the groove blade an unprocessed material web remains on a groove side opposite the direction of the forward feed movement, said web being removable with the main blade.

* * * * *